GARDNER & TRAGESER.
Velocipede.
No. 87,769.
2 Sheets—Sheet. 1.
Patented March 16, 1869.
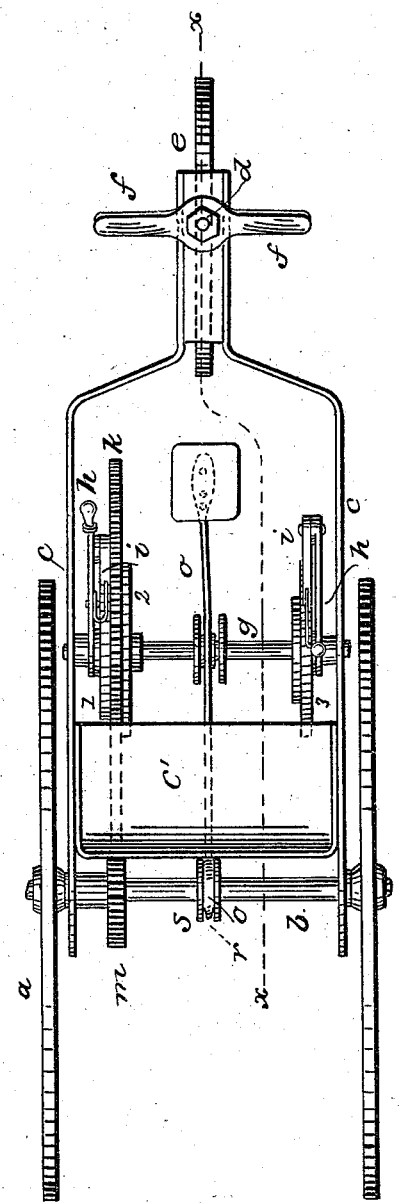
Fig. I.
Witnesses
Chas H Smith.
Geo. D Walker
Inventor.
F. B. Gardner J. Trageser.
per L. W. Serrell
Atty GARDNER & TRAGESER.
Velocipede.
No. 87,769.
2 Sheets—Sheet 2.
Patented March 16, 1869.
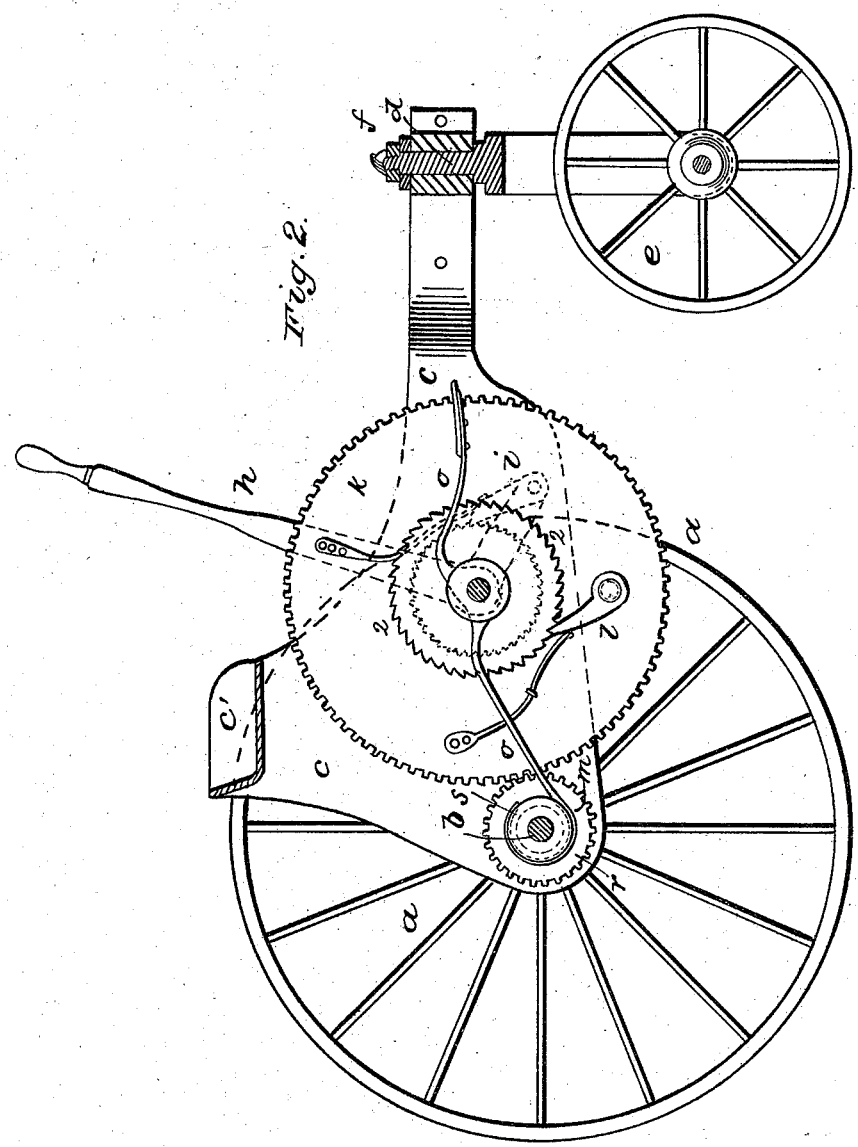

FRANKLIN B. GARDNER AND JOHN TRAGESER, OF NEW YORK, N. Y.

Letters Patent No. 87,769, dated March 16, 1869.

IMPROVED VELOCIPEDE.

The Schedule referred to in these Letters Patent and making part of the same.

*To all whom it may concern:*

Be it known that we, FRANKLIN B. GARDNER and JOHN TRAGESER, of the city and State of New York, have invented and made a new and useful Improvement in Velocipedes; and we do hereby declare the following to be a full, clear, and exact description of the said invention, reference being had to the annexed drawing, making part of this specification, wherein—

Figure 1 is a plan of the said velocipede, and

Figure 2 is a vertical longitudinal section of the same at the line $x\ x$.

Similar marks of reference denote the same parts.

The object of this invention is to enable the rider to propel the velocipede by the hands, and steer the same by the feet.

The said invention consists in a pair of hand-levers, fitted to work upon a cross-shaft, and, by pawls, act upon ratchet-wheels, to rotate said cross-shaft, and upon this is a third ratchet-wheel acting, by a pawl, upon a gear-wheel, that takes a pinion upon the axle of the driving-wheels; hence, when the movement of the handles is arrested, the velocipede can run without obstruction from the gearing, because the pawl, on the gear-wheel, has simply to run back over the ratchet-teeth.

We also arrange the brake in a peculiar manner, so that it can be operated by the foot to stop the vehicle.

In the drawing—

$a\ a$ are the hind wheels, forming the drivers. These are on the axle $b$; and $c\ c$ are side-frames, extending to the pintle $d$ of the front wheel $e$, which is used for steering, the foot-pieces, or cross-bar $f$, being provided for this purpose.

Upon the frames $c\ c$, a seat or seats are to be introduced. We have shown a seat at $c'$.

Between the frames $c\ c$ is a cross-shaft, $g$, upon which three ratchet-wheels, 1, 2, 3, are fastened.

The shaft $g$ also forms the fulcrum for the hand-levers $h\ h'$, said levers having eyes at their ends, through which the shaft $g$ passes, and each lever carries a spring-pawl, $i$, to take the respective teeth of the wheels 1 or 3.

Between the wheels 1 and 2 is a gear-wheel, $k$, having upon it a spring-pawl, $l$, taking the ratchet-wheel 2, and this wheel $k$ gears into a pinion, $m$, on the axle $b$.

It will now be understood that the driver, working the levers $h\ h'$ alternately, communicates to the shaft $g$, a continuous or nearly continuous rotation, and this drives the wheel $k$ by the ratchet 2 and pawl $l$, and, by the pinion $m$, drives the velocipede, and if the levers $h\ h'$ are not operated, the momentum will continue to give motion to the velocipede, and turn the pinion $m$ and wheel $k$, the pawl $l$ of which will run back over the teeth of the wheel 2, and there will be but little resistance.

The shaft $g$ is also the fulcrum for the brake-lever $o$, that is fitted with a foot-piece at one end, and at the other end acts upon a strap, $r$, that passes around a wheel, $s$, on the axle $b$, so as to stop the momentum, whenever desired.

What we claim, and desire to secure by Letters Patent, is—

1. The hand-levers $h\ h'$ on the shaft $g$, fitted with pawls, to take the ratchet-wheels 1 and 3, in combination with the ratchet-wheel 2, pawl $l$, and wheel $k$, gearing to the pinion $m$, the parts being arranged and applied in the manner and for the purposes set forth.

2. In combination with the foregoing, the brake-lever $o$, having the shaft $g$ for its fulcrum, and arranged to operate upon the wheel $s$, as set forth.

In witness whereof, we have hereunto set our signatures, this 11th day of February, 1869.

FRANKLIN B. GARDNER.
JOHN TRAGESER.

Witnesses:
CHAS. H. SMITH,
GEO. T. PINCKNEY.